United States Patent [19]

Grove et al.

[11] 4,413,173
[45] Nov. 1, 1983

[54] ELECTRIC TOASTER CONTROL

[75] Inventors: Lawrence L. Grove, Lyme, Conn.; Donald G. Benner, Whitehall, Pa.

[73] Assignee: General Electric Company, New York, N.Y.

[21] Appl. No.: 301,983

[22] Filed: Sep. 14, 1981

[51] Int. Cl.³ .......................... A47J 37/08; H05B 1/02
[52] U.S. Cl. .................................... 219/412; 219/413; 219/414; 99/332; 99/389
[58] Field of Search ............... 219/413, 391, 412, 414, 219/395, 398, 405, 408; 335/1; 99/327, 332, 335, 389, 329 R, 359, 385; 337/1, 3; 200/238, 239, 247–251; 126/335

[56] References Cited

U.S. PATENT DOCUMENTS

| | | | |
|---|---|---|---|
| 3,119,000 | 1/1964 | Lock et al. | 219/19 |
| 3,660,637 | 5/1972 | Grove | 219/413 |
| 3,684,860 | 8/1972 | Snyder | 219/413 |
| 3,684,861 | 8/1972 | Snyder | 219/413 |
| 3,752,955 | 8/1973 | Grove | 219/413 |
| 4,065,658 | 12/1977 | Keim | 219/386 |
| 4,178,498 | 12/1979 | Snyder | 219/413 |
| 4,188,867 | 2/1980 | DeRemer | 99/385 |
| 4,189,632 | 2/1980 | Swanson | 219/413 |
| 4,302,660 | 11/1981 | Swanson | 219/413 |

FOREIGN PATENT DOCUMENTS 1392459 4/1975 United Kingdom ............... 219/413

Primary Examiner—B. A. Reynolds
Assistant Examiner—Teresa J. Walberg
Attorney, Agent, or Firm—Leonard J. Platt; George R. Powers; John F. Cullen

[57] ABSTRACT

An electric oven toaster construction wherein an interrupt mechanism is provided for interrupting operation of a toast timer controller when the oven toaster door is opened. An interrupt lever is positioned between a door operated rod and a heat-up/cool-down bi-metal timer controller so that when the door is opened the interrupt lever moves the toasting period controller to its off position. Thus, when the door is opened during a toasting cycle operation, the toasting period controller is returned to its off position so that a user is required to reset a new full-toast cycle when the door is reclosed. This arrangement prevents undertoasted bread that could result if fresh bread is inserted in the middle of a toasting cycle.

2 Claims, 7 Drawing Figures

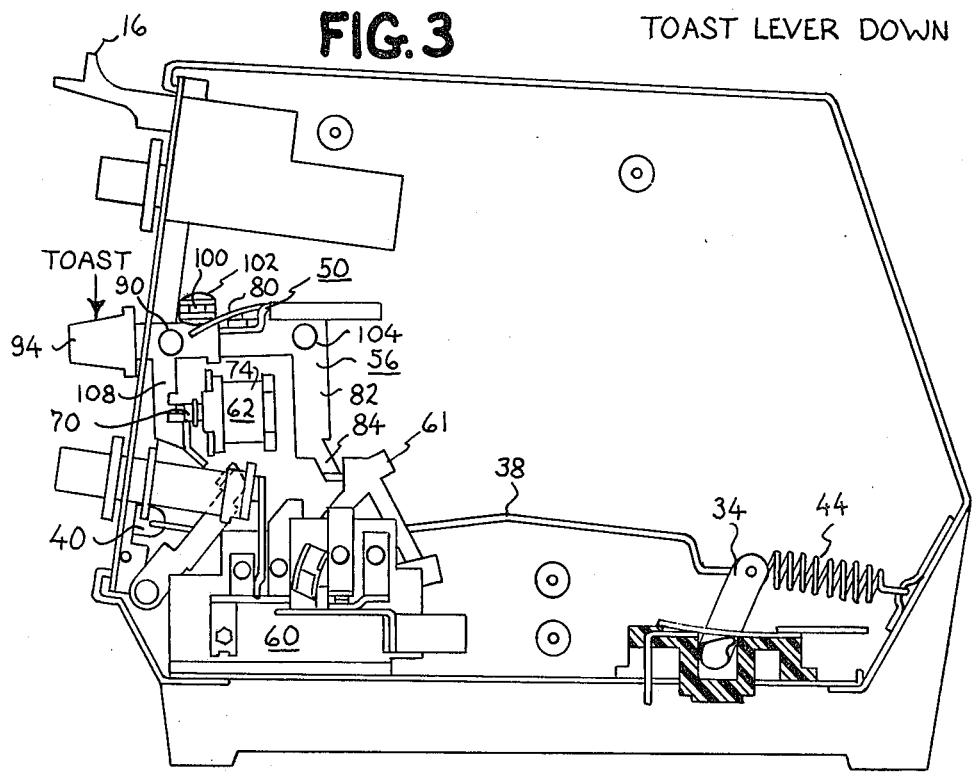
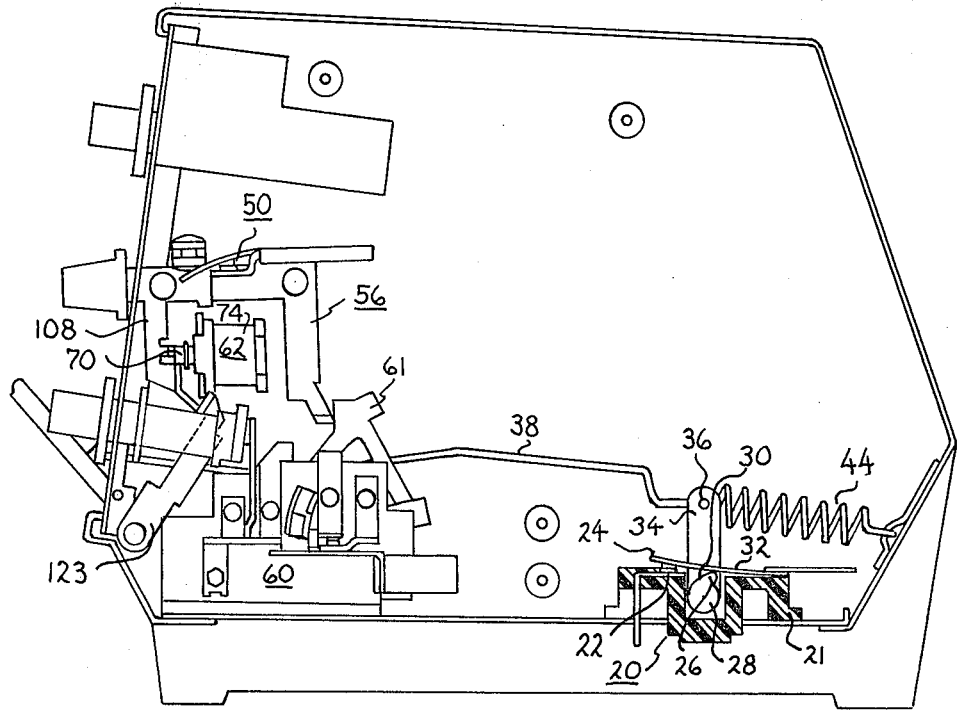

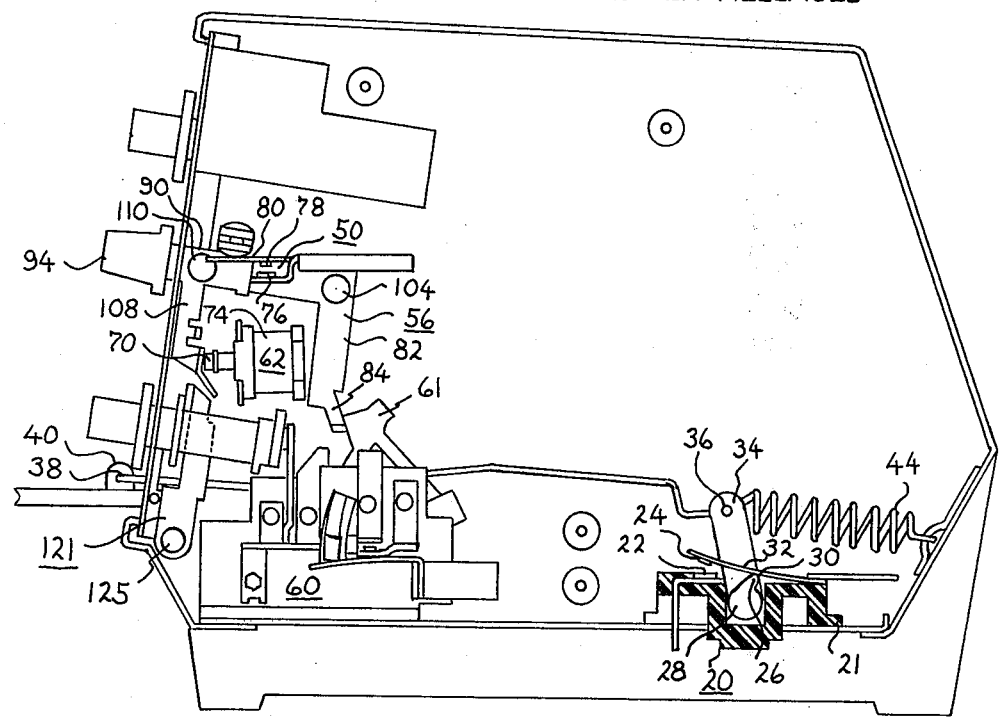
FIG.5  DOOR OPEN TOAST LEVER RELEASED
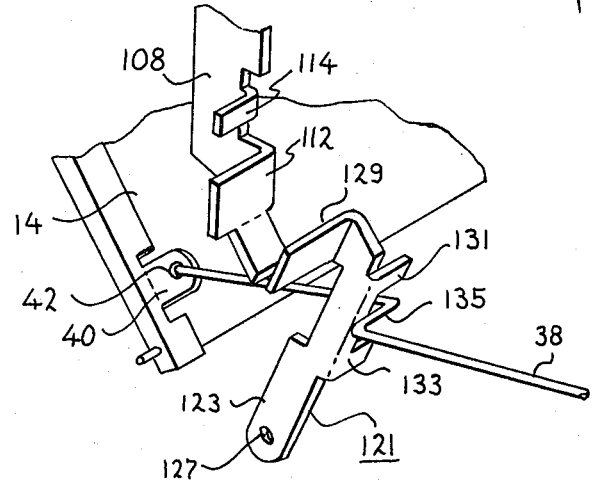
FIG.6

ELECTRIC TOASTER CONTROL

BACKGROUND OF THE INVENTION

1. Field of the Invention

This invention relates to an electric oven toaster and more particularly to a control mechanism for such an oven toaster for preventing undertoasted bread when a toast cycle is interrupted by opening the oven toaster door.

2. Description of the Prior Art

In a prior U.S. Pat. No. 4,178,498 to Paul V. Snyder, assigned to the same assignee as the present invention, there is disclosed an arrangement for controlling operation of an oven toaster. The oven toaster includes a toast switch 50 in series with a main switch 20, and upper and lower heating elements 52 and 54, respectively. Both the main switch 20 and the toast switch 50 have to be closed in order to energize the heating elements 52 and 54. The main switch 20 is automatically closed as the door 14 is closed, and a manually operable lever 56 is provided for opening and closing the toast switch 50. A heat-up/cool-down bi-metal toast cycle timer controller 60 is positioned at the lower front portion of the oven toaster and its solenoid 62 is positioned above the main portion of the timer 60 with its armature 70 extending forwardly.

The toast start switch 50 for energizing the heating elements 52 and 54 after the door 14 has been closed is positioned directly above the solenoid 62–70. Downward motion of knob 94 will cause the generally horizontal leg 90 of the lever 56 to be moved downwardly to close switch contacts 76 and 78. During this movement, the generally vertical leg 82 of the manually operable lever 56, and particularly, its lower tab 84 will be moved rearwardly to move actuator 61 of the toast cycle time controller 60 from its off position illustrated in FIG. 2 to its on position illustrated in FIG. 3. The manually operable lever 56 includes a latch arm 108 that engages the solenoid armature 70 for holding the lever 56 in a toast switch closed position during a toasting cycle.

When a user opens the door 14 to interrupt a toast operation actuating rod 38 is pulled forwardly to open the main switch 20 but the toast lever 56 remains latched to the solenoid armature 70. Consequently, when the door is reclosed, the main switch 20 is closed and the toast timer 60 completes the remaining part of the toast cycle. Naturally, this operation is acceptable if the same slice of bread remains in the toaster oven; however, if a fresh slice of bread is inserted while the door is opened, a short toast cycle and undertoasted bread will result unless the toast knob 94 is lifted and then moved down to re-set a full toast cycle.

Our invention is concerned with such oven toaster control mechanisms and, more particularly, to an improved simplified control mechanism wherein a unique interrupt lever mechanism is provided for requiring a user to start a new full toast cycle when the door is opened to thereby prevent undertoasted bread.

SUMMARY OF THE INVENTION

Accordingly, it is a particular object of our invention to provide an improved control mechanism for an electric oven toaster for preventing undertoasted bread when a toast cycle is interrupted by opening the oven toaster door.

It is still a further object of this invention to provide a reliable and low-cost toaster controller interrupt lever mechanism between a toaster oven door and a toaster oven controller for interrupting the controller so that it is automatically moved to its off position whenever the oven door is opened beyond a predetermined position so that when the oven door is subsequently closed, a user has to reset the controller to obtain a full toast cycle. With such an interrupt mechanism, undertoasted bread is prevented since a full toast cycle is required to be reset whenever the oven toaster door is opened beyond a predetermined position.

In accordance with one of the aspects of this invention, an electric oven toaster includes a front door for opening and closing an enlarged opening in the front wall, a heating means for supplying heat to a toasting chamber and a toast switch for energizing and de-energizing the heating means. A toasting period controller is provided for opening the toast switch means to de-energize the heating means at the end of a toasting cycle. A manually-operable lever is positioned between the toast switch and the toasting period controller for manually closing the toast switch and starting the operation of the toasting period controller. The toast switch is spring-biased to an open position and the manually operable lever includes a latch arm which is movable into engagement with the toasting period controller for holding the manually operable lever and the toast switch in a closed position against the spring bias of the toast switch. The toast period controller includes a means that is actuated at the end of a toasting cycle to release the latch arm of the manually-operable lever. A toast cycle interrupt lever is positioned between the door and the manually operable lever for releasing the latch arm from the toasting period controller when the door is opened. Thus, when the door is opened, the toast switch is opened and a leg of the manually operable lever is moved to permit the toasting period controller to be moved to its off position. Accordingly, should the door of the oven toaster be opened by a user beyond a predetermined position while bread is being toasted, the interrupt lever mechanism will automatically open the toast switch and return the toasting period controller to its off position. With this construction, a user will be required to start a new full toast cycle after the door has been reclosed and, with a new full toast cycle, undertoasted bread will be prevented.

With my improved toast lever interrupt mechanism, relatively few additional parts are required for insuring that the toaster controller is moved to its off position when the door is opened to a certain position. A single lever is positioned between a previously required manually operable lever and a rod that previously extended between an oven toaster door and an oven toaster main switch. One end of the interrupt lever is shaped to abut the latch arm of the manually operable lever and a mid portion of the interrupt lever is formed to receive a reshaped offset portion of the door link. Thus, an exceedingly simple, reliable oven toaster interrupt lever mechanism has been achieved.

BRIEF DESCRIPTION OF THE DRAWING

Other objects and attendant advantages of the invention will be apparent from the following description taken in connection with the accompanying drawing in which:

FIG. 3 is a fragmentary side elevational view similar to FIG. 2 showing the positions of the parts at the commencement of a toasting cycle;

FIG. 4 is a side elevational view similar to FIG. 3 showing the positions of the parts after the door has been partially opened to temporarily open the main switch;

FIG. 5 is a side elevational view similar to FIG. 2 showing the positions of the parts after the door has been fully opened with the toast switch open, the main switch open, and the toast timer controller actuator in its off position;

FIG. 6 is an enlarged fragmentary exploded perspective view of portions of my unique interrupt lever mechanism for opening the toast switch and moving the toasting period controller actuator to its off position when the door is fully opened, the parts being shown with the door partially opened with the interrupt lever about to move the latch arm of toast manually operable lever;

DESCRIPTION OF THE PREFERRED EMBODIMENT

Figure 1:
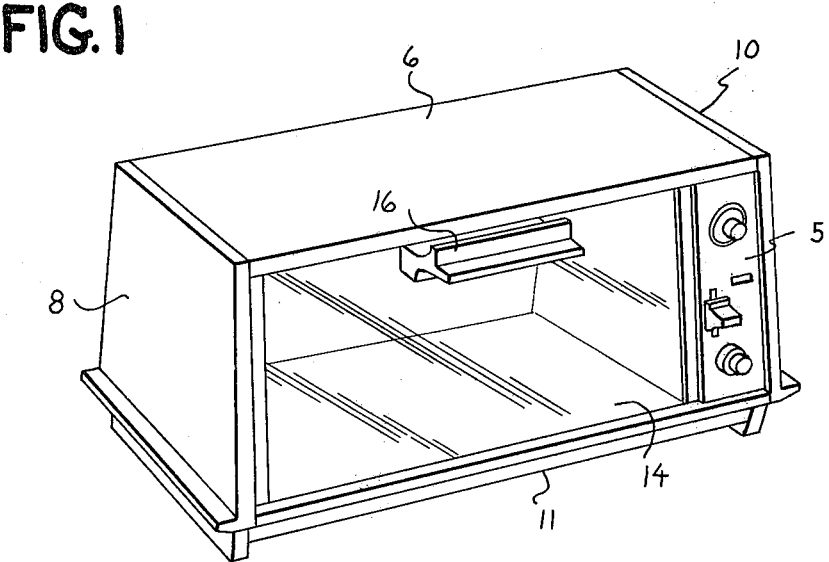
FIG. 1 is a perspective view of an electric oven toaster embodying our improved electric toaster control mechanism.
Figure 2:
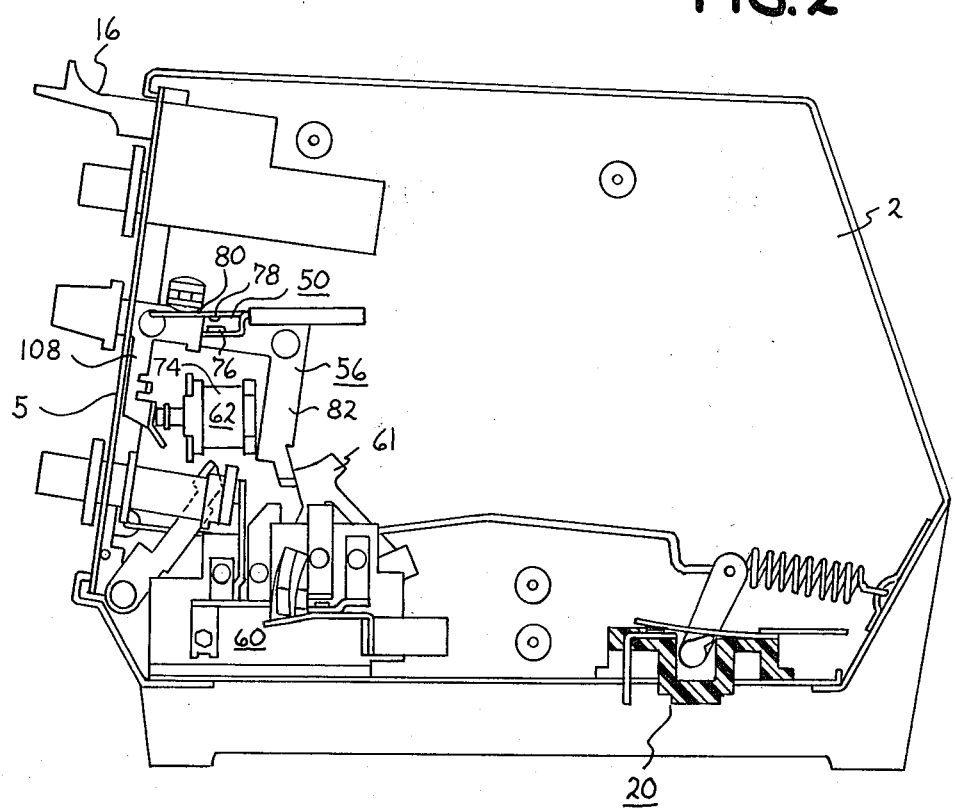
FIG. 2 is a fragmentary side elevational view of a portion of our electric toaster control mechanism showing the off position of the parts after the door has been closed but before commencement of a toasting cycle.

Referring now to the drawing and first particularly to FIGS. 1 and 2, there is shown an electric oven toaster which includes a toasting and oven chamber 2 for holding food to be cooked or bread to be toasted. The oven toaster includes a generally vertical front wall 5, a generally horizontal top wall 6, generally parallel vertical side walls 8 and 10, a bottom wall 11 and a front opening to provide access to the inside of the oven toaster.

A front door 14 is provided for closing the front opening. The door is pivotally mounted to the lower portion of the oven toaster and a handle 16 is provided for opening the door.

The front door 14 is linked to a main switch 20 so that movement of the front door in a door opening direction will result in opening the main switch. As shown more particularly in FIGS. 4 and 5, the main switch 20 includes a fixed contact 22 and a movable contact 24. An actuating cam lever 26 is integrally formed with a shaft member 28 which is mounted for rotation on the switch housing 21. The actuating cam lever 26 includes a cam surface 30 that is movable into slidable engagement with the underside of a switchblade 32 which holds switch contact 24, and an integrally formed upwardly extending actuating arm. An upper portion of the actuating arm 34 is provided with an aperture 36 for receiving one end of a wire actuating rod 38. The actuating rod 38 extends from the arm 34 to a tab 40 which may be formed with the front door 14. The rod 38 is inserted through an aperture 42 in the tab 40 in order to pivotally mount the rod to the door tab. A spring 44 is connected to the rod 38 and a rear portion of the oven toaster housing for biasing the rod and the door in a door closing direction.

With this construction, it can be appreciated that when the door is moved to its door open position illustrated in FIG. 5, rod 38 will rotate the cam 30 in a counterclockwise direction to lift switchblade 32 to open switch contacts 24, 22. Conversely, when the door is closed, as illustrated in FIG. 3, for example, the spring 44 will rotate cam 30 to move the high point of the cam from the underside of switchblade 32 to permit the switch contacts 24 and 22 to be closed as illustrated in FIG. 3.

Figure 7:
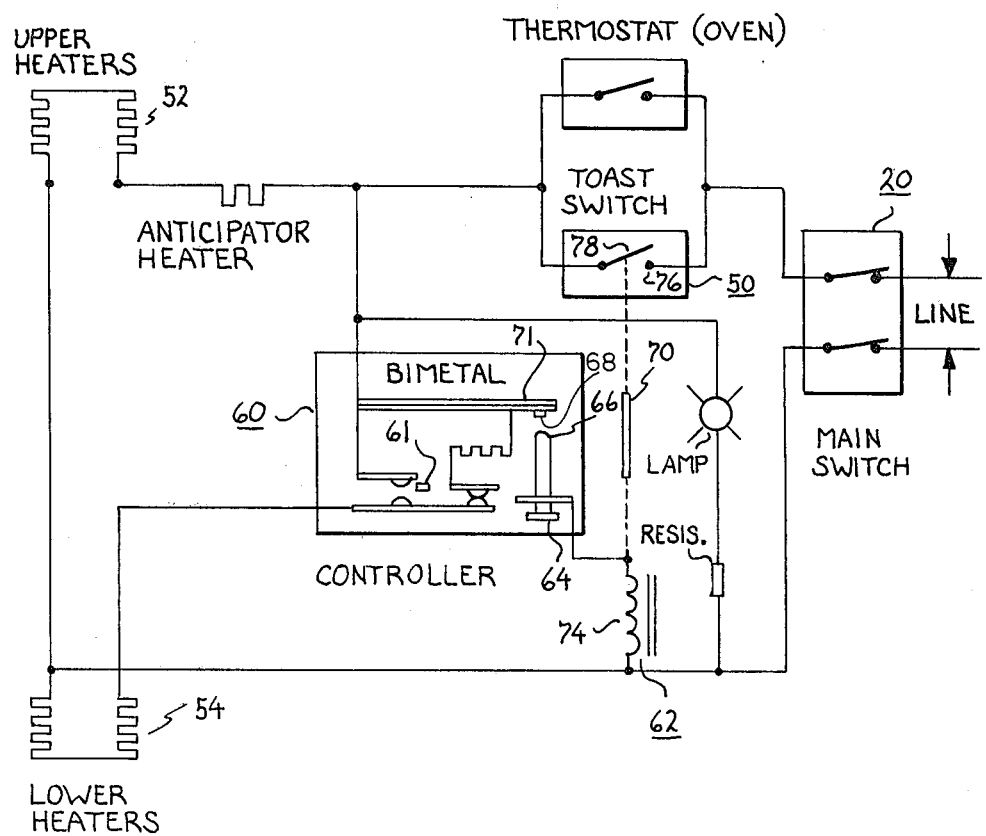
FIG. 7 is a circuit diagram and partial schematic view of portions of the control mechanism for the electric oven toaster illustrated in FIGS. 1-6.

Referring now to the circuit diagram illustrated in FIG. 7, it can be seen that the oven toaster includes a toast switch 50 in series with the main switch 20, and upper and lower heating elements 52 and 54, respectively. Thus, it can be appreciated that both the main switch 20 and the toast switch 50 have to be closed in order to energize the heating elements 52 and 54. The main switch 20 is automatically closed as the door 14 is closed, and a manually operable lever 56, to be more fully described hereinafter, is provided for opening and closing the toast switch 50.

TOASTING PERIOD CONTROLLER

As shown more particularly in FIG. 3 and the circuit diagram illustrated in FIG. 7, a heat-up/cool-down bi-metal timer controller 60 for timing a toasting cycle is mounted at the forward portion of the oven toaster. The controller 60 includes a solenoid 62 for releasing the manually operated lever 56 at the end of a toasting cycle. While the details of the heat-up/cool-down bi-metal timer do not form a part of my invention and are described and illustrated in greater detail in a prior U.S. Pat. No. 3,529,534, assigned to the same assignee as the present invention, a brief description of the timer is desirable for an understanding of the instant invention. It should be appreciated that the timer 60 is started by rotating its actuator 61 in a clockwise direction from a position illustrated in FIG. 2 to the position illustrated in FIG. 3. This movement starts the heat-up cycle of the heat-up/cool-down bi-metal timer. With reference to FIG. 7, it should also be appreciated that at the termination of the cool-down cycle of the heat-up/cool-down bi-metal timer switch contacts 66 and 68 are closed to thereby energize solenoid 62 to release the manually operable lever 56 from the solenoid movable core 70. As shown more particularly in FIGS. 1, 5 and 7, the heat-up/cool-down bi-metal timer controller 60 is position at the lower front portion of the oven toaster and its solenoid 62 is positioned above the main portion of the heat-up/cool-down bi-metal timer with its movable core 70 extending forwardly. A solenoid spring normally urges the generally horizontal movable core 70 outwardly from a solenoid coil 74.

The toast start switch 50 for energizing the heating elements 52 and 54 after the door 14 has been closed is positioned above the solenoid 62. As shown more particularly in FIG. 2, the start switch includes a fixed contact 76 and a movable contact 78 that is mounted on an upwardly biased switchblade 80. Thus, the contacts 76 and 78 are normally held out of engagement with each other.

The manually operable lever 56 that is positioned between the toast timer 60 and the start switch 50 will now be more particularly described. As shown in FIG. 5, the lever is shaped generally in the form of an inverted L and it includes a downwardly extending generally vertical leg 82 for rotating the heat-up/cool-down bi-metal timer actuator 61 from its off position illustrated in FIG. 5 to its on position illustrated in FIG. 3. Thus, the downwardly extending leg 82 includes a generally horizontal lower tab 84 for smooth operating contact with the actuator 61.

The other leg 90 of the inverted L-shaped lever 56 extends forwardly through a slot that may be formed in the front wall 5 of the oven toaster. As shown in FIG. 3, a knob 94 may be attached to the outer end portion of the horizontal leg 90 of the lever for enabling the lever to be conveniently operated. The generally horizontal leg 90 of the operating lever 56 includes a toast switch operating arm 100 that extends transversely from the horizontal arm 90 to a position directly above switchblade 80. As shown more particularly in FIG. 3, the outer end of arm 100 may carry an insulator button 102 in order to suitable insulate the switchblade 80 from the operating lever 56.

The lever 56 is pivotally mounted at the intersection of its legs 82 and 90 by a pivot 104. Thus, the lever 56 may be readily operated by simply moving the knob 94. It can be appreciated that downward motion of the knob 94 will cause the generally horizontal leg 90 of the lever to be moved downwardly to close switch contacts 76 and 78. During this movement, the generally vertical leg 82 of the manually operable lever 56, and particularly its lower tab 84 will be moved rearwardly to move actuator 61 from its off position illustrated in FIG. 2 to its on position illustrated in FIG. 3.

The manually operable lever 56 includes a latch arm 108 for holding the lever 56 in a toast switch closed position during a toasting cycle. As shown more particularly to FIGS. 5 and 6, the latch arm 108 extends generally downwardly and a rivet 110 or other suitable securing means may be used for fixing the latch arm 108 to the generally horizontal arm 90 of the lever 56. The lower portion of the latch arm 108 includes a generally transverse tab 112 for smooth contact with the end portion of the solenoid movable core 70. Another transverse tab 114 is integrally formed with the latch arm 108 and is located a short distance upwardly and to the left of the tab 112 as shown in FIG. 4.

The left end portion of the movable core 70 of the solenoid is shaped for latching engagement with the tabs 112, 114. As shown in FIG. 3, when the lever 56 is moved downwardly to its latched position during a toasting cycle, the lower portion of the generally cyclindrical movable core 70 is moved into engagement with the upper surface of tab 112 and the left surface of the movable core 70 is in engagement with the right surface of tab 114. In this position, the spring bias of switchblade 80 urges tab 112 upwardly into contact with movable core 70 and the lever 56 will be held in the position illustrated in FIG. 3 during the toasting cycle. Nevertheless, in the FIG. 3 position, it can be appreciated that the lever 56 is pivoted to the toaster so that its generally horizontal leg is inclined slightly downwardly and the latch arm 108 is inclined slightly to the right from a vertical position and thus, upon manual movement of the knob 94 from the position illustrated in FIG. 3 upwardly to the position illustrated in FIG. 2, the latch arm 108 will be moved forwardly to release the latch arm 108 from the solenoid movable core 70. Accordingly, with this construction, whenever it is desired to interrupt the toaster heating elements without opening the oven toaster door, it is merely necessary to lift the knob 94 to release the latch 108 from the solenoid movable core 70. during such movement, the upper surface of the tab 112 slides on the lower surface of movable core 70 and the unlatching movement is completed as the right side surface of the tab 112 slides on the left side surface of the movable core 70 and the switchblade 80 of the toast switch assists movement of the lever 56 to its off position illustrated in FIG. 2.

The toasting period controller thus far described is described and illustrated in greater detail in a prior U.S. Pat. No. 4,178,498, assigned to the same assignee as the present invention.

In accordance with our invention, an interrupt lever mechanism 121 is positioned between the latch arm 108 of the manually operable lever 56 and a link rod 38 which is connected between the door and the main switch. As previously mentioned, the purpose of the interrupt lever mechanism is to open the toast switch 50 and return the actuator 61 of the toasting period controller 60 to its off position whenever the oven toaster door is opened beyond a predetermined position. With such an arrangement, undertoasted bread is prevented since the user has to reset the toasting period controller actuator 61 to its start position illustrated in FIG. 3 whenever the oven toaster door has been moved to its fully opened position illustrated in FIG. 5. As shown more particularly in FIGS. 5 and 6, the interrupt lever mechanism 121 includes an interrupt lever 123, which is suitable pivotally mounted to the oven toaster by means of a rivet 125 that extends through an aperture 127 that is formed in the lower portion of the interrupt lever. As shown in FIG. 6, the upper portion of the interrupt lever includes a tab 129 for engaging the lower portion of the latch arm 108 of the manually operable lever. The interrupt lever 123 also includes two tabs 131 and 133 for guiding an offset portion 135 of the door link 38. With this arrangement, when the door 14 is opened, the door link 38 is moved forwardly, its offset portion 135 abuts the rear portion of the interrupt lever 123 to move the interrupt lever and the latch arm 108 forwardly to release the latch arm 108 from the movable core 70 of the toast period controller.

OPERATION

In operation, slices of bread or other food may be placed in the oven toaster and the door closed. During movement of the door to its closed position, the rod 38 which is connected to the door closes the main switch 20. Then a toast cycle may be started by depressing the knob 94. It can be appreciated that movement of the knob 94 downwardly closes the toast switch 50, and this same movement moves the generally vertical leg 82 rearwardly to move the actuator 61 of the toast period controller from its off position illustrated in FIG. 2 to its on position illustrated in FIG. 3. During this movement, the latch arm 108 of the lever 56 is also moved downwardly to slide the tab 112 on the movable core 70 until the tab 112 is moved below the movable core. Upon release of the knob 94, the switchblade 80 will move the latch arm 108 a short distance upwardly but further movement will be prevented by the latching engagement of the upper surface of tab 112 with the lower surface of the solenoid movable core 70. Now with particular reference to the circuit diagram illustrated in FIG. 7, it can be appreciated that the heat-up/cool-down bi-metal timer controller 60 will function to heat bi-metal 71. After the bi-metal has been heated, it cools down and switch contacts 66 and 68 are closed to energize the solenoid 62. When the solenoid is energized, its movable core 70 will be pulled to the right against the force of the solenoid spring and the solenoid movable core will move inwardly far enough to release the latch arm 108. With the latch released, the switch blade 80 moves horizontal leg 90 of the lever 56 upwardly from the position illustrated in FIG. 3 to the position illustrated in FIG. 2 to open the toast switch 76, 78 to de-energize the heating elements 52 and 54.

Now, let us consider what will happen with our new toast interrupt lever mechanism should the oven toaster door be opened in the middle of a toasting cycle. When this occurs and the door is partially opened to the position illustrated in FIGS. 4 and 6, it can be seen that the link 38 moves the interrupt lever 123 far enough forwardly to abut the lower portion of the latch lever 108 but the latch lever remains latched to the movable core 70 of the solenoid. As the door is opened further than the position illustrated in FIG. 4 to the position illustrated in FIG. 5, for example, continued movement of the rod 38 will move the interrupt lever 123 forwardly to release the latch arm 108 from the movable core 70 to return the lever 56 to the off position illustrated in FIG. 5. In that position, the toast switch 50 is opened and the toast cycle controller 61 is moved to the off position. Thus, when the door is reclosed after additional slices of bread are added to the toaster oven, it will be necessary to move the toast knob 94 downwardly to reset the toaster controller actuator 61 to the on position illustrated in FIG. 3. During this movement, the toast switch 50 will be moved to its closed position and the toast period controller actuator 61 will be moved to its start position and a new full toast cycle will result.

From the foregoing description, it will be appreciated that our improved simplified interrupt mechanism for moving the toast period controller actuator 61 to its off position when the door is opened has been achieved with relatively few parts that have been uniquely combined with each other. A single lever 123 is readily formed and pivotally mounted on the oven toaster. The remaining parts are those that have been previously used for operating the oven toaster although the main switch operating rod 38 has been uniquely reshaped to provide an offset portion 135 that cooperates with the interrupt lever to move the interrupt lever forwardly when the door is opened. Thus, an exceedingly simple and reliable mechanism is achieved with the use of relatively few parts.

What we claim is:

1. In an electric oven toaster having wall means including a front wall with an enlarged opening, a front door movably connected to said front wall for closing said enlarged opening, a heating means for supplying heat to a toasting chamber, a toast switch for energizing and de-energizing said heating means, a main switch connected to the door for energizing and de-energizing said heating means, and a toasting period controller for opening the toast switch means to de-energize the heating means at the end of a toasting cycle, the improvement comprising:
   a. a manually operable lever positioned between said toast switch means and said toasting period controller for manually closing the toast switch means and starting the operation of the toasting period controller;
   b. said toasting period controller including a solenoid arranged to be actuated at the end of a toasting cycle;
   c. said solenoid including a solenoid coil and a movable core member;
   d. said switch means being spring biased to an open position and said lever including a latch arm which is movable into engagement with the movable core member of said solenoid for holding the lever and said switch in a closed position against the spring bias of said switch;
   e. said toasting period controller including means for actuating said solenoid at the end of the toasting cycle to move said movable core to release said latch arm from said movable core at the end of a toasting cycle to permit the switch to be opened under the force of its spring bias and to move the lever to an off position;
   f. a toast cycle interrupt lever pivotally mounted on said toaster oven, said interrupt lever having a front facing surface and a rear facing surface; and
   g. a door link connected to said door and movable therewith, the door link being engageable with the rear facing surface of said interrupt lever to move the interrupt lever front facing surface forwardly to engage the manually operable lever for releasing said latch arm from the movable core member of said toasting period controller when the door is opened so that the switch is opened and the leg of said manually operable lever is moved to return the toasting period controller to its starting position to thereby require a user to start a new full toast cycle when the door is reclosed.

2. In an electric oven toaster having wall means including a front wall with an enlarged opening, a front door movably connected to said front wall for closing said enlarged opening, a heating means for supplying heat to a toasting chamber, a toast switch for energizing and de-energizing said heating means, a main switch connected to the door for energizing and de-energizing said heating means, and a toasting period controller for opening the toast switch means to de-energize the heating means at the end of a toasting cycle the improvement comprising:
   a. a manually operable lever positioned between said toast switch means and said toasting period controller for manually closing the toast switch means and starting the operation of the toasting period controller;
   b. said toasting period controller including a solenoid arranged to be actuated at the end of a toasting cycle;
   c. said solenoid including a solenoid coil and a movable core member;
   d. said switch means being spring biased to an open position and said lever including a latch arm which is movable into engagement with the movable core member of said solenoid for holding the lever and said switch in a closed position against the spring bias of said switch;
   e. said toasting period controller including means for actuating said solenoid at the end of the toasting cycle to move said movable core to release said latch arm from said movable core at the end of a toasting cycle to permit the switch to be opened under the force of its spring bias and to move the lever to an off position; and
   f. toast cycle interrupt lever means positioned between said door and the manually operable lever for releasing said latch arm from the movable core member of said toasting period controller when the door is opened so that the switch is opened and the leg of said manually operable lever is moved to return the toasting period controller to its starting position to thereby require a user to start a new full toast cycle when the door is reclosed;

said interrupt lever means including:
  i. an interrupt lever pivotally mounted on said over toaster; and
  ii. a door link rod connected to said door and said main switch, said door link rod being shaped to move said interrupt lever to release the latch arm of said manually operable lever when the door is opened.

* * * * *